(12) United States Patent
Tarbotton et al.

(10) Patent No.: US 6,757,830 B1
(45) Date of Patent: Jun. 29, 2004

(54) DETECTING UNWANTED PROPERTIES IN RECEIVED EMAIL MESSAGES

(75) Inventors: Lee Codel Lawson Tarbotton, Leicester (GB); Daniel Joseph Wolff, Aylesbury (GB); Nicholas Paul Kelly, Milton Keynes (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 822 days.

(21) Appl. No.: 09/678,688

(22) Filed: Oct. 3, 2000

(51) Int. Cl.[7] .......................... G06F 11/30; G06F 12/14
(52) U.S. Cl. ..................... 713/188; 713/200; 713/201; 709/226
(58) Field of Search ..................... 709/206; 713/188, 713/200, 202, 201; 714/26, 38; 707/3

(56) References Cited

U.S. PATENT DOCUMENTS

| | | | | |
|---|---|---|---|---|
| 5,832,208 A | * | 11/1998 | Chen et al. | 713/201 |
| 5,889,943 A | * | 3/1999 | Ji et al. | 713/201 |
| 5,960,170 A | * | 9/1999 | Chen et al. | 714/38 |
| 6,651,249 B2 | * | 11/2003 | Waldin et al. | 717/170 |
| 6,654,787 B1 | * | 11/2003 | Aronson et al. | 709/206 |
| 2002/0198950 A1 | * | 12/2002 | Leeds | 709/206 |

* cited by examiner

*Primary Examiner*—Emmanuel L. Moise
(74) *Attorney, Agent, or Firm*—Silicon Valley IP Group, PC; Kevin J. Zilka; Christopher J. Hamaty

(57) ABSTRACT

Received e-mail messages are subject to a minimum delay period determined in dependence upon characteristics of the e-mail message received. Prior to release of the e-mail message upon expiry of the minimum delay period a check is made that the most up-to-date anti-virus and anti-spamming tests have been applied to the e-mail message. Characteristics that may be used to determine the minimum delay period applied include sender characteristics, recipient characteristics, attachment type characteristics and message content type characteristics.

45 Claims, 8 Drawing Sheets

| RULE | CHARACTERISTIC | ACTION |
|---|---|---|
| #0 | MAIL PREVIOUSLY DELAYED | DELAY = 0, BYPASS ALL FURTHER RULES |
| #1 | ALL MAIL | DELAY = 10 MINS |
| #2 | SENDER INTERNAL | BYPASS ALL FURTHER RULES |
| #3 | SENDER = ALERTS@NAI.COM | DELAY = 0 MINS, BYPASS ALL FURTHER RULES |
| #4 | *.EXE OR *.COM ATTACHMENT | DELAY = 6 HOURS, BYPASS RULE #5 |
| #5 | *.DOC OR *.BAT ATTACHMENT | DELAY = 1 HOUR |
| #6 | RECIPIENT = ADMINISTRATOR@CORP.COM | DELAY = CURRENT DELAY x 2 |
| #7 | MESSAGE CONTENT TYPE = HTML | DELAY = 20 MIN |

FIG. 4

| PREVIOUSLY DELAYED | SENDER | RECIPIENT | ATTACHMENTS | MESSAGE TYPE | RESULTING DELAY |
|---|---|---|---|---|---|
| YES | XYZ@ABC.COM | ADMINISTRATOR @CORP.COM | PROGRAM.EXE | TEXT | 0 |
| NO | XYZ@ABC.COM | ADMINISTRATOR @CORP.COM | PROGRAM.EXE | TEXT | 12 HOURS |
| NO | USER@CORP.COM | ADMINISTRATOR @CORP.COM | PROGRAM.EXE | TEXT | 10 MINS |
| NO | ALERTS@NAI.COM | ADMINISTRATOR @CORP.COM | PROGRAM.EXE | TEXT | 0 |
| NO | XYZ@ABC.COM | USER @CORP.COM | LETTER.DOC | TEXT | 1 HOUR |
| NO | USER@CORP.COM | ADMINISTRATOR @CORP.COM | PROGRAM.EXE | HTML | 20 MINS |

FIG. 5

HEADER

DELIVERED-TO: USER@CORP.COM

SENDER: SCYZ@ABC.COM

RECEIVED: FROM ANOTHERCORP.COM

CONTENT-TYPE: EXE

X-DELAY APPLIED 4:00:00

X-PGP CHECKSUM <EO456A1>

MESSAGE

ATTACHMENT(S)

PROGRAM.EXE

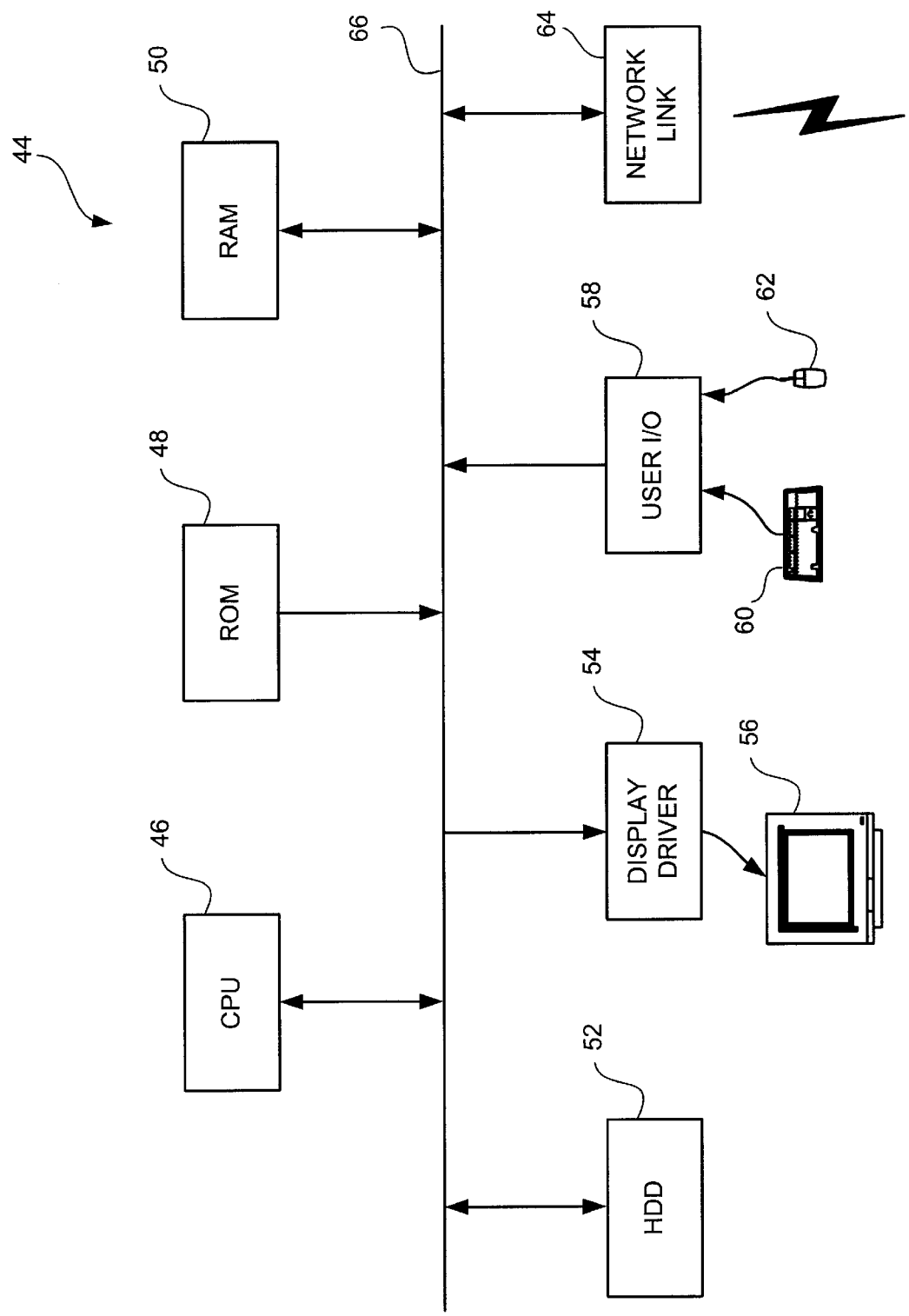

DETECTING UNWANTED PROPERTIES IN RECEIVED EMAIL MESSAGES

BACKGROUND OF THE INVENTION

1. Field of the Invention

This invention relates to the field of data processing systems. More particularly, this invention relates to systems for detecting unwanted properties in received e-mail messages.

2. Description of the Prior Art

E-mail has become an accepted and fundamental part of both business and personal communication. Whilst the benefits of the widespread use of e-mail are considerable, a problem that has arisen is that received e-mail messages may have unwanted properties. As an example, it has become increasingly common for e-mail messages to bear computer viruses that can be damaging to computer systems upon which they are received. E-mail has the potential to rapidly distribute such computer viruses and is becoming an increasingly common and destructive technique used by virus writers to propagate their viruses. Another example of e-mail having unwanted properties is so called spam e-mail, which is unsolicited by the recipient and often contains advertising or other unwanted material. As a consequence of the speed and low cost of sending such spam e-mails, the number of spam e-mails received by a user may become inconvenient to the degree that it interferes with their legitimate desired received e-mails.

It is known to provide e-mail anti-virus computer systems for automatically scanning received e-mails to detect any computer viruses they may be carrying. It is also known to provide anti-spamming filters that may be set to detect the receipt of multiple e-mails with the same title or from the same recipient and then block such e-mails as they are highly likely to be spam e-mails.

A problem with the above anti-virus and anti-spamming systems is that they are necessarily at least one step behind the virus writer or spam originator. More particularly, a new computer virus may be mass e-mailed to a large number of recipients causing a rapid outbreak of computer virus induced damage to computer systems. It takes a finite amount of time before anti-virus system providers can react to a new virus and generate appropriate counter measures which may then be distributed to their customers. During this delay period, many computer virus infected e-mails may be received by users and cause damage to their computer systems. Considerable effort is made to react as quickly as possible to computer virus outbreaks and create and distribute appropriate counter measures, but even if this process takes less than one hour, the speed of e-mail distribution is such that there may still be a considerable amount of damage to computer systems caused during this period.

In the case of anti-spamming systems, such as title, sender or content filters, it is normally only after receipt of a threshold number of e-mails containing consistent characteristics that such filters may be triggered or created. By this time, the spam e-mails already received will have made their way to end users causing disruption to those end users.

SUMMARY OF THE INVENTION

Viewed from one aspect the present invention provides a method of detecting an e-mail message having one or more unwanted properties using one or more tests, said one or more tests being updateable in response to detection of new unwanted properties, said method comprising the steps of:

receiving an e-mail message having associated one or more e-mail message characteristics and addressed to one or more recipients for said e-mail message;

determining a minimum delay period in dependence upon said one or more e-mail message characteristics;

storing said e-mail message for said minimum delay period;

applying said one or more tests current at expiry of said minimum delay period to said e-mail message to identify if said e-mail message has any of said one or more of unwanted properties;

if said e-mail message does not have any of said one or more unwanted properties, then sending said e-mail message to said one or more recipients; and if said e-mail message does have any of said one or more unwanted properties, then blocking sending of at least a portion of said e-mail message to said one or more recipients.

Whilst it is normally the aim in e-mail processing systems to transfer a received e-mail message onto its intended recipient as rapidly as possible, the present invention moves against this preconception by deliberately introducing a minimum delay period for which an e-mail message is stored prior to being passed onto the intended recipient or recipients. Introducing such a deliberate minimum delay period significantly increases the likelihood that the tests for unwanted properties that are current at the expiry of the minimum delay period will include counter-measures developed and distributed during the minimum delay period and so may identify the problem e-mail before it reaches the user. Furthermore, by determining the minimum delay period in dependence upon characteristics of the e-mail message concerned, the delay may be selected to reflect the likelihood of a particular e-mail-message having unwanted properties.

Whilst it will be appreciated that the characteristics of the e-mail message that may be used in determining the minimum delay period could take many different forms, particularly well suited to use in this way are a sender address, a sender organisation, a recipient address, a recipient organisation, an attachment type and an e-mail message content type.

These characteristics may be used individually or in combination in many different ways. E-mail messages received from a particular organisation known to have a history of sending computer virus infected e-mails can be subject to a higher level of minimum delay period than e-mails received from other sources. However, if it is know that within such a sender organisation there is a particular sending individual who is careful to avoid sending computer virus infected e-mails, then e-mail messages from that particular individual may be subjected to a shorter minimum delay period if required. In a similar way, particular recipient organisations or recipient individuals may be known to be more likely to receive computer virus or unwanted e-mails and accordingly these recipient organisations or recipient individuals may have their received e-mails subject to a higher level of minimum delay period. If an e-mail message contains attachment types, then certain forms of attachment type represent a higher risk of computer virus infection, e.g. executable file attachments or file attachments of a type that may contain a macrovirus are of a higher risk category than a plain text or pure data attachment. Similarly, certain e-mail message content types, such as for example html message content, may represent a higher likelihood of showing unwanted properties than other types, such as plain text.

It will be appreciated that if unwanted characteristics are detected, then various different courses of action are possible. For example, the e-mail message could be disinfected and sent onto the recipient, offending attachments could be blocked but the remainder of the message sent on or the e-mail message in its entirety could be blocked as the safest course of action.

Whilst it will be appreciated that the technique of the present invention could be used to reduce the problem of e-mails having a wide variety of unwanted properties, the present invention is particularly useful when those unwanted properties are the presence of computer viruses. In this context, the advantage of providing an extra minimum delay period before an e-mail message is passed on significantly increases the likelihood that updated virus definition data will be available to detect newly released viruses before they are passed on.

The advantage of the use of up-to-date virus definition data is enhanced when this data is automatically periodically updated, particularly using a remote internet server.

Another type of e-mail having unwanted properties which the present invention helps to detect and prevent being spread is spam e-mail containing common characteristics. The minimum delay period imposed by the technique of the invention allows a threshold level of e-mail messages having the common characteristics to be detected prior to any of the spam e-mails being passed onto the recipients and so allows all of the spam e-mail messages to be blocked. A large number of spam e-mails may be received within a short period of time and so the minimum delay period may be relatively short and still be effective at reducing spam e-mail reaching users.

The common characteristics that can be used to identify spam e-mails include a common sender, a common recipient, a common message title, a common message size, a common attachment, a common attachment type and a common message context amongst other possible indicators of spam e-mail.

It will be appreciated that an e-mail message is often relayed through several computer systems prior to reaching its recipient. If each of these systems imposes its own minimum delay period, then the propagation time for the e-mail message could be increased too greatly. Accordingly, in preferred embodiments the invention include adding applied delay data to an e-mail message when a minimum delay period has been applied to it. This applied delay data may then be detected by subsequent systems through which the e-mail message passes and the imposition of further minimum delays selectively disabled if so chosen.

In order to reduce the possibility of tampering with such applied delay data in an attempt to circumvent the minimum delay period imposed, authentication data may also be applied to an e-mail message in conjunction with applied delay data so that the applied delay data may be properly authenticated.

Whilst the present invention may be considered to be most readily applicable to an e-mail server receiving e-mail messages for attached client e-mail systems, the technique may also be applied to outbound messages from that server or within purely relay servers that do not have any of their own e-mail client systems.

In order to reduce the delay in propagation once the minimum delay period has expired, preferred embodiments can apply tests to detect the unwanted properties as soon as an e-mail message is received or whilst it is being stored for the minimum delay period, and then these tests repeated only if they have been updated once the minimum delay period has expired.

It will be appreciated that the tests for unwanted properties could be updated by pull techniques whereby the system performing the tests itself sought to access updated tests or alternatively by push techniques whereby updated tests are sent to the system applying those tests without the system first requesting them. The invention is particularly well suited to systems which apply a pull update technique as a pull update can be attempted prior to expiry of the minimum delay period in order that the most accurate assessment may be made of what is the current state of the tests for unwanted properties prior to release to the recipient of an e-mail message. A pull could be attempted selectively when a high risk message was received, such as a message having an executable attachment.

Viewed from another aspect the invention also provides apparatus for detecting an e-mail message having one or more unwanted properties using one or more tests, said one or more tests being updateable in response to detection of new unwanted properties, said apparatus comprising:

a receiver operable to receive an e-mail message having associated one or more e-mail message characteristics and addressed to one or more recipients for said e-mail message;

delay determining logic operable to determine a minimum delay period in dependence upon said one or more e-mail message characteristics;

a storage device operable to store said e-mail message for said minimum delay period;

test logic operable to apply said one or more tests current at expiry of said minimum delay period to said e-mail message to identify if said e-mail message has any of said one or more of unwanted properties; and mail processing logic operable if said e-mail message does not have any of said one or more unwanted properties to send said e-mail message to said one or more recipients and operable if said e-mail message does have any of said one or more unwanted properties to block sending of at least a portion of said e-mail message to said one or more recipients.

Viewed from a further aspect the invention also provides a computer program product carrying a computer program for controlling a computer to detect an e-mail message having one or more unwanted properties using one or more tests, said one or more tests being updateable in response to detection of new unwanted properties, said computer program comprising:

receiver code operable to receive an e-mail message having associated one or more e-mail message characteristics and addressed to one or more recipients for said e-mail message;

delay determining code operable to determine a minimum delay period in dependence upon said one or more e-mail message characteristics;

storage code operable to store said e-mail message for said minimum delay period;

test logic operable to apply said one or more tests current at expiry of said minimum delay period to said e-mail message to identify if said e-mail message has any of said one or more of unwanted properties; and mail processing code operable if said e-mail message does not have any of said one or more unwanted properties to send said e-mail message to said one or more recipients and operable if said e-mail message does have any of said one or more unwanted properties to block sending of at least a portion of said e-mail message to said one or more recipients.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 shows examples of rules for determining a minimum delay period from characteristics of an e-mail message;

FIG. 5 illustrates how the rules from FIG. 4 may be applied to several messages to give differing minimum delay periods;

FIG. 8 illustrates a general purpose computer of the type which may be used to implement the techniques of an example of the present invention.

DESCRIPTION OF THE PREFERRED EMBODIMENTS

Figure 1:
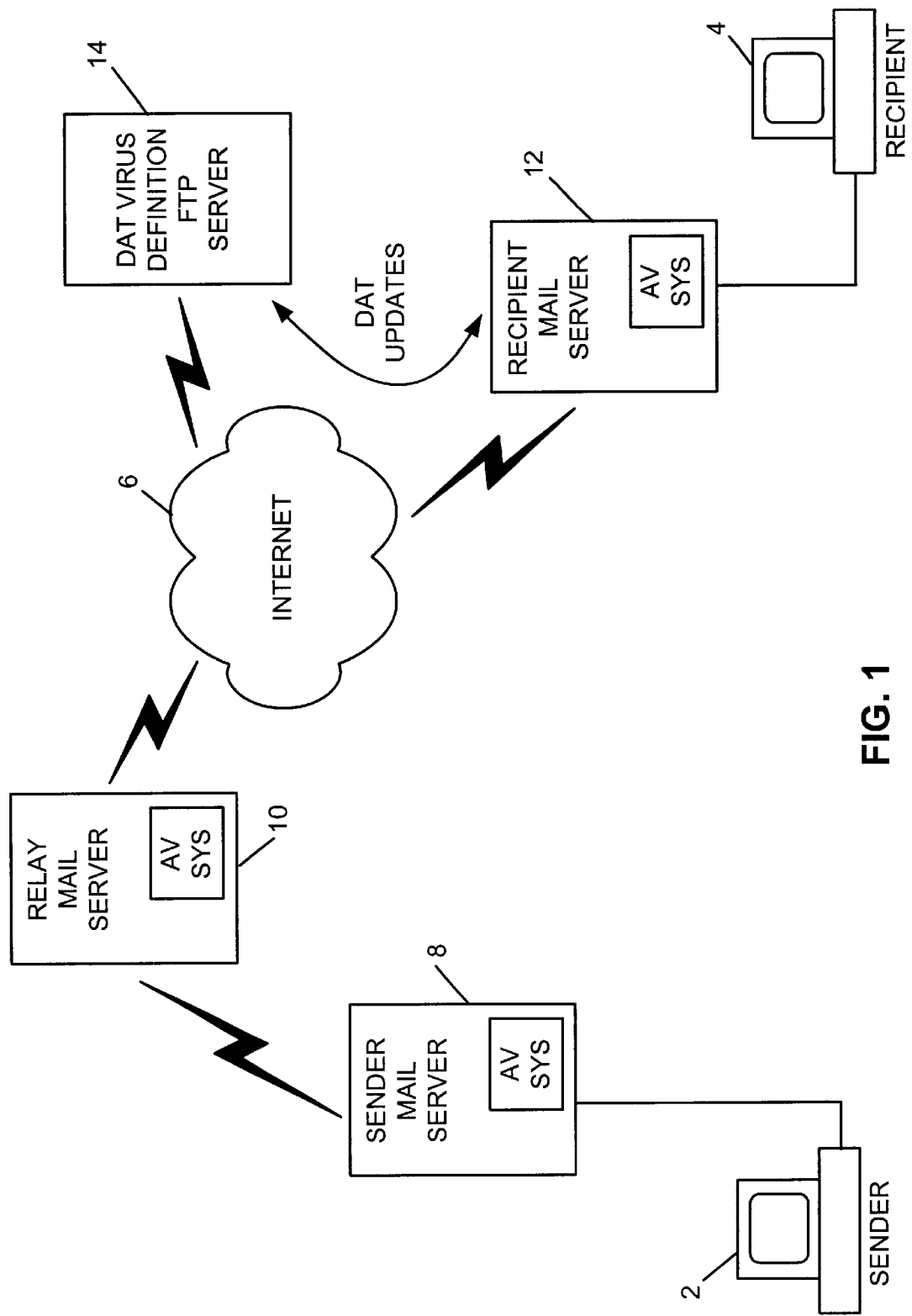
FIG. 1 schematically illustrates the passage of an e-mail message from a sender to a recipient via a plurality of mail servers including anti-virus systems.

FIG. 1 illustrates how an e-mail sender client computer 2 may issue an e-mail message to a recipient client computer 4 via a network of computers connected via the internet 6. The e-mail message progresses from the sender client computer 2 via a sender mail server 8, a relay mail server 10, the internet 6 and a recipient mail server 12 until it reaches a recipient client computer 4. Each one of the sender mail server 8, the relay mail server 10 and the recipient mail server 12 includes an anti-virus and anti-spam system that can be used to detect unwanted properties in e-mail messages passing through that respective server. The anti-virus portions of the systems mentioned above use virus definition data that is periodically updated from a virus definition server 14 accessed via the internet 6. In this example, the virus definition server 14 is an FTP server, although it will be appreciated that different sorts of servers or data sources may be used to provide the updated virus definition data.

In contrast to the prior approach whereby each of the sender mail server 8, the relay mail server 10 and the recipient mail server 12 would seek to process and pass on received e-mail messages as rapidly as possible, the technique described herein deliberately introduces a minimum delay period in at least one of these servers that is selected in dependence upon characteristics of the e-mail message such that e-mail messages posing a higher risk of unwanted properties are effectively quarantined for a longer period than e-mail messages having characteristics indicative of a lower risk.

Figure 2:
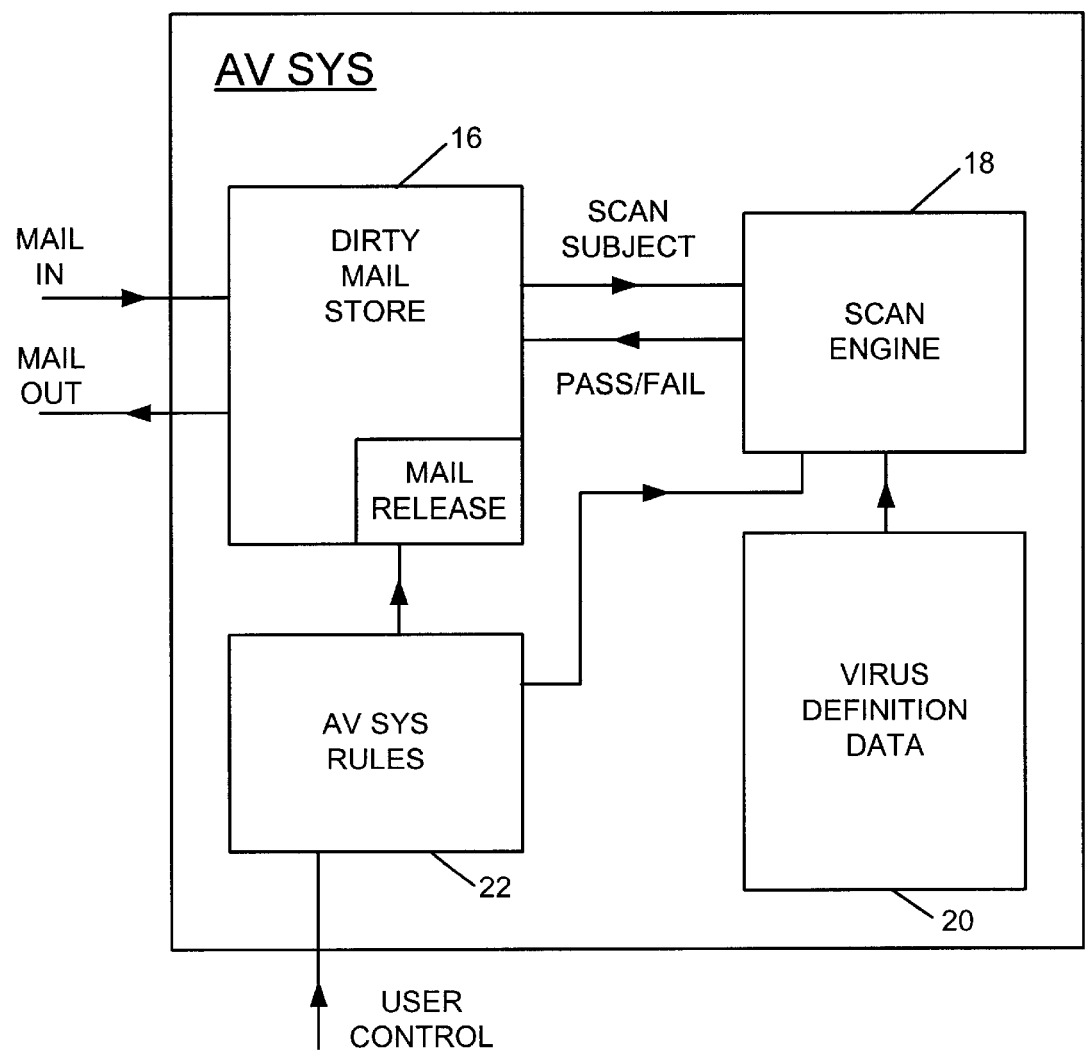
FIG. 2 schematically illustrates an anti-virus system in more detail.

FIG. 2 schematically illustrates an anti-virus system in more detail. Received e-mail messages are stored within a dirty mail store 16 whilst they have tests for computer viruses applied to them and prior to being released once verified as not containing computer viruses or having been disinfected or modified if a computer virus is detected within them. The e-mail messages held within the dirty e-mail store 16 are subject to anti-virus scans by a scanning engine 18 that uses virus definition data 20. The virus definition data 20 is periodically updated on a timed basis from a remote source, such as from the anti-virus system producers' FTP server 14.

When an e-mail message is stored into the dirty mail store 16, an anti-virus system rules unit 22 using parameters set under user control applies a sequence of rules to the characteristics possessed by the received e-mail message to determine a minimum delay period for which the e-mail message will be held within the dirty mail store 16. The calculated minimum delay period is stored together with the mail data within the dirty mail store and when the minimum delay period has expired the e-mail message is released providing it passes the most current version of the anti-virus tests using the latest virus definition data 20.

It may be that processing resource has been available during the minimum delay period to conduct the anti-virus scanning prior to the end of the minimum delay period and in this case a check may de to determine that the most current tests have been applied prior to release and only further testing undertaken if the most current tests have not already been applied. If the message has characteristics indicative of a high risk of carrying a virus, e.g. an executable or *.doc attachment, then a pull attempt for new virus definition data may also be made toward the end of the minimum delay period.

It will be appreciated that the updating of virus definition data is only one example of how the test to be applied may be updated during the passage of the minimum delay period. Other examples of the updating of the test to be applied would be if systems had detected an outbreak of virus activity and imposed different anti-virus control parameters or, in the case of anti-spam, that during the minimum delay period a large number of e-mail messages having a common characteristic (e.g. the same title or same sender) had been received and an anti-spam filter then imposed to block these e-mail messages prior to them being sent to the intended recipients. It will be appreciated that an anti-spam system looking for common characteristics may also operate upon mail held with the dirty mail store 16 during the minimum delay period.

Figure 3:
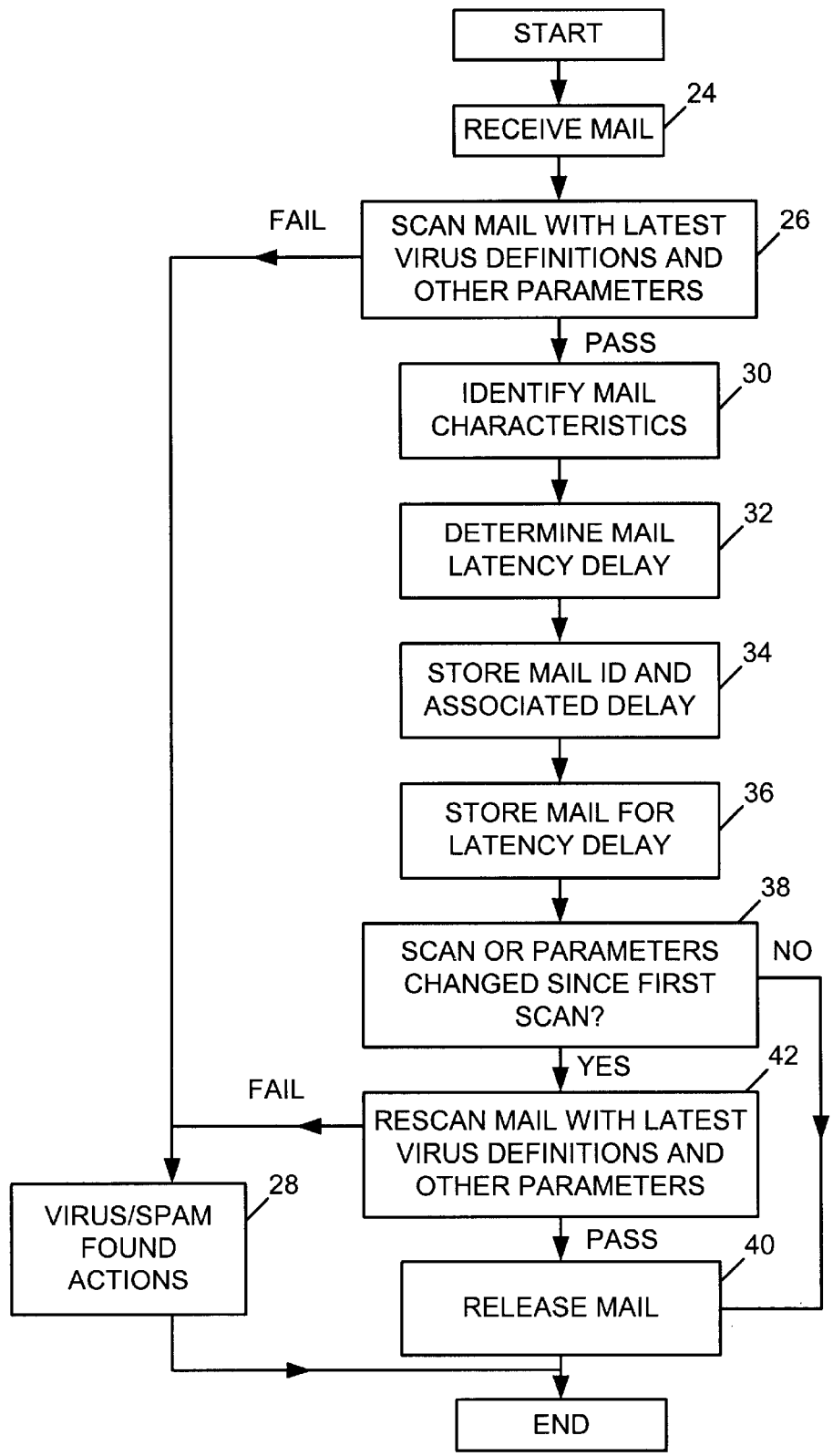
FIG. 3 is a flow diagram representing processing performed by the anti-virus system of FIG. 2.

FIG. 3 is a flow diagram illustrating the processing that the anti-virus system of FIG. 2 may perform. At step 24, an e-mail message is received. At step 26, a test/scan for unwanted properties using the latest virus definition, virus scan control parameters, anti-spam filters and other parameters is made. If unwanted properties are found, then processing proceeds to step 28 at which anti-virus or anti-spam actions are taken. These actions may be to disinfect the e-mail message, to remove infected portions of the e-mail message, to block the e-mail message altogether or to modify the e-mail message. Additional actions may be to issue warnings to a system administrator or all users and potentially to increase anti-virus scanning activity (e.g. turn on heuristics etc or perform an on-demand scan).

If the scan/test at step 26 does not reveal any unwanted properties, then processing proceeds to step 30 at which selected characteristics of the received e-mail message are identified. At step 32, the identified characteristics are used to determine a minimum delay period to be applied to the received e-mail message.

At step 34 the message ID for the received e-mail message and the associated determined minimum delay value are stored back within the dirty mail store 16. The received e-mail message is then effectively held in quarantine within the dirty mail store 16 for the minimum delay period determined during step 36.

Once the minimum delay period has expired, then step 38 checks to see if the virus definition data or other parameters of the scan/test have changed since the scan/test was applied at step 26. If there has been no change, then the e-mail message is released to the recipient via step 40 after an applied delay stamp with PKI authentication has been applied.

If there has been a change in the scan/test such that a more current scan/test may now be applied, then this more current scan/test is applied at step 42. If step 42 indicates a fail of the scan/test, then processing proceeds via step 28 as described above. If the more up-to-date test applied at step 42 is passed, then the e-mail message is released at step 40.

FIG. 4 schematically illustrates a sequence of rules that may be applied to received e-mail messages in order to determined the minimum delay period to be applied. These rules may be generated and applied in a manner similar to rule based processing performed for other purposes by existing known e-mail systems (e.g. rules based processing for automatic forwarding or filing of received e-mails).

Rule #0 detects whether the received e-mail message contains data indicating that a previous system within the transmission chain for that e-mail message has applied a minimum delay period for that message already. This delay applied stamp may be authenticated using authentication data, such as a PKI checksum, that is embedded within the received e-mail message by the previous system that applied the delay. If Rule #0 detects that the E-mail message has already been subject to a minimum delay period, then the delay set for the current system is zero and all further rules are bypassed.

Rule #1 applies a default delay of ten minutes to all received mail messages and then passes processing on to the further rules. A default delay of ten minutes is chosen at a level to match the update pull request frequency of the anti-virus system being used such that if a message is held for at least ten minutes then there is a high probability that a check for the very latest anti-virus definition data will have been made during that time. Similarly, holding a mail message for ten minutes is chosen such that if that mail message is the first within a sequence of spam mail messages, then the likelihood will be that the anti-spam counter measures will be triggered and appropriate blocking filters inserted and applied prior to the expiry of the minimum delay period for the first of the spam e-mail messages.

Rule #2 detects whether the sender of the e-mail message is internal to the organisation controlling the e-mail server. If the sender is internal, and accordingly assumed to be trusted and appropriately protected, then further rules are by passed.

Rule #3 serves to detect a specific e-mail sending address associated with the received e-mail message. In this case, if the e-mail originates from a sending address that is known to propagate virus warnings, then it would be undesirable for such an e-mail to be delayed and accordingly rule #3 sets the delay to zero for such a sender and bypasses further rules.

Rule #4 applies a delay of 6 hours to any e-mail messages that contain a *.exe or a *.com attachment and bypasses rule #5. It has been found that e-mails containing *.exe or *.com files are a highly likely source of virus infections and accordingly a long minimum delay period is appropriate in sensitive environments.

Rule #5 detects different attachment types (in this case documents, that could contain macroviruses, or batch files) and imposes a delay of one hour if these are found.

Rule #6 detects if the intended recipient for the received e-mail message is a particular recipient address (this could also be a group of addresses or an organisation). If the recipient address is the administrator user of the host organisation, then whatever delay has previously been calculated is doubled. Administrator users typically have full access rights to all parts of a computer system and accordingly if they do become infected with computer viruses the potential damage can be greater and so more cautious quarantining of received e-mail messages is justified.

Rule #7 examines the message content type of the received e-mail message to see if it is html. It is known that html can contain unwanted properties, such as enabling virus-like actions, and accordingly the delay for such messages is set to twenty minutes, which is double the default delay applied to all messages at Rule #1.

FIG. 5 illustrates characteristics of a number of example received e-mail messages and how the rules of FIG. 4 may produce a minimum delay period for each message.

In the first example, the received e-mail message includes data indicating that a previous system through which the message has passed has already applied a minimum delay period to that message and accordingly rule #0 sets the delay to zero for that message irrespective of any other characteristics.

In the second example, the default delay of ten minutes set by rule #1 is increased to six hours by rule #4 on detection of the program.exe attachment. Rule #6 subsequently doubles this applied minimum delay period to twelve hours when the intended recipient is identified as being the administrator on the recipient network.

In the third example, the sender is detected by rule #2 as being internal to the organisation hosting the mail server applying the rules and accordingly all rules subsequent to rule #2 are bypassed. Thus, rules #4 and #6 that produced the long twelve hour delay in the previous example are not triggered in this example. This reduced minimum delay period is justified as the anti-virus measures within the host organisation are known and secure such that the likelihood of virus infection from an internal source is low. Similarly, the likelihood of spam e-mail originating internally is negligible.

The fourth example illustrates how rule #3 detects an e-mail message received from a specific trusted sender and accordingly sets the minimum delay period to zero even though other characteristics of the e-mail message would have imposed a long minimum delay period as illustrated in the second example.

The fifth example illustrates the application of rule #5 to impose a one hour delay due to detection of a document type attachment to an e-mail that would otherwise have the default ten minute delay imposed.

Finally, the sixth example illustrates how rule #7 detects that the message content type of the received e-mail message is html rather than plain text and accordingly increases the default minimum delay period that would otherwise be set by Rule #1 from ten minutes to twenty minutes.

Figure 6:
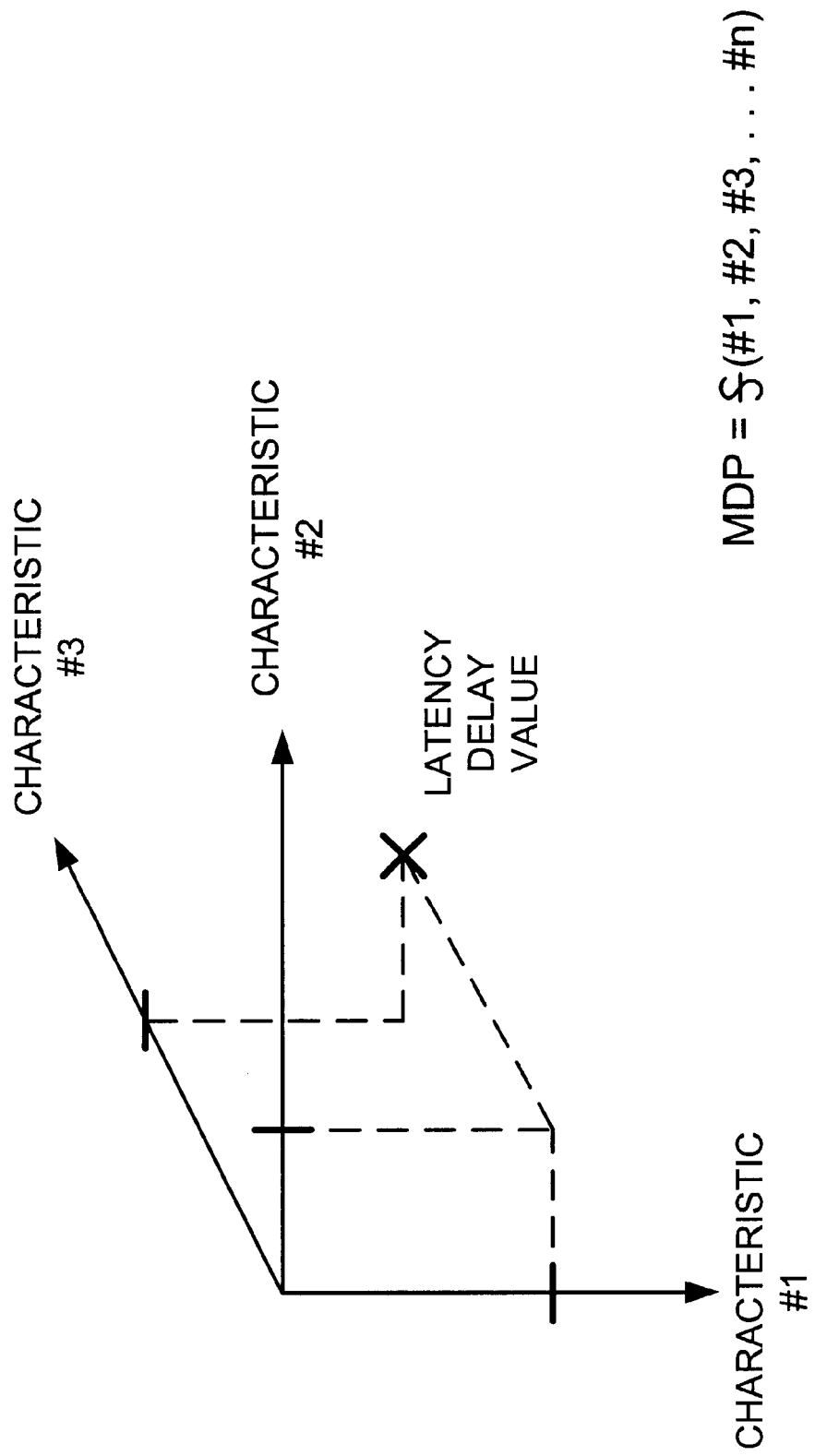
FIG. 6 illustrates an alternative mechanism by which the minimum delay periods may be determined from the characteristics of an e-mail.

FIG. 6 schematically illustrates another approach to determination of the minimum delay periods from the e-mail characteristics. The technique of FIGS. 4 and 5 is the sequential application of a set of carefully ordered and constructed rules. Such an approach is known in other types of automated mail processing as previously mentioned. However, the approach illustrated in FIG. 6 is to provide an N-dimensional matrix within which the minimum delay period to be applied can be looked up in dependence upon N e-mail characteristics effectively defining a point within that N-dimensional matrix. The N-dimensional matrix can be populated with values using an approach similar to that illustrated in FIGS. 4 and 5.

Once the minimum delay period has been established as a function of the N e-mail characteristics, then it may be applied in accordance with the flow diagram of FIG. 3 as previously set out.

Figure 7:
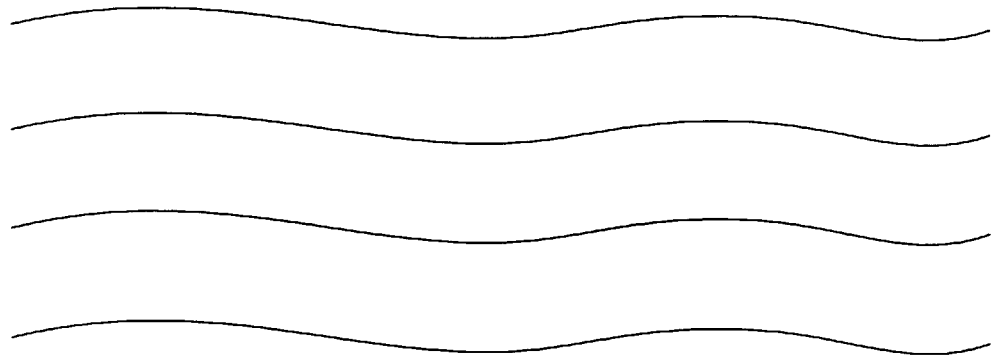
FIG. 7 illustrates an e-mail message showing various characteristics used by the above technique.

FIG. 7 schematically illustrates a e-mail message including a header portion, a message text portion and an attachment portion.

The header portion includes tagged data indicating the recipient (user@corp.com), the sender (xyz@abc.com) and an organisation that has acted as a relay server (anothercorp.com). A further tag indicates that an attachment is included that is an *.exe attachment. The "x-" tag is interpreted by conventional smtp systems as a REM statement that is not acted upon by the smtp systems themselves. This tag may be used to prefix embedded data indicating that a minimum delay period of four hours has already been applied to this e-mail message by a preceding e-mail system (e.g. the anothercorp.com system) and a PKI checksum value for the e-mail message as a whole as a countermeasure against attempts to falsely insert data indicating that a minimum delay period has already been applied.

The message type in the present case is plain text, but it could be html or possibly a batch file in other examples. The attachment at the end of the e-mail message has already been indicated as being an executable file type and in this example is a file program.exe.

FIG. 8 schematically illustrates a general purpose computer 44 of the type that may be used to implement the above techniques. The general purpose computer 44 includes a central processing unit 46, a read only memory 48, a random access memory 50, a hard disk drive 52, a display driver 54 and associated display 56, a user input/output unit 58 and associated keyboard 60 and mouse 62 together with a network link unit 64 all coupled together via a common bus 66. In operation, the central processing unit 46 may execute program instructions stored within one or more of the read only memory 48, the random access memory 50 or the hard disk drive 52 to perform desired data processing operations. These data processing operations can implement the previously described techniques by the provision of appropriate computer code routines. Parameters for controlling the operation of the technique may be input by a user using the keyboard 60 and mouse 62 and the results of the processing may be displayed to the user via the display device 56. E-mail messages can be received for quarantining within the general purpose computer 44 via the network link unit 64 and subsequently passed onto a recipient computer via this network link unit 64. The computer program may be loaded into the general purpose computer 44 using a physical recording medium, such as a compact disk or floppy disk, or by downloaded into the general purpose computer 44, such as by downloading from a remote internet site.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of detecting an e-mail message having one or more unwanted properties using one or more tests, said one or more tests being updateable in response to detection of new unwanted properties, said method comprising the steps of:

receiving an e-mail message having associated one or more e-mail message characteristics and addressed to one or more recipients for said e-mail message, wherein the e-mail message characteristics include at least one of:
sender address;
sender organization;
recipient address;
recipient organization;
attachment type; and
e-mail message content type;
determining a minimum delay period in dependence upon said one or more e-mail message characteristics for increasing the likelihood that said one or more tests for said unwanted properties that are current at the expiry of the minimum delay period will include counter-measures developed during the minimum delay period;
storing said e-mail message for said minimum delay period;
applying said one or more tests current at expiry of said minimum delay period to said e-mail message to identify if said e-mail message has any of said one or more of unwanted properties;
if said e-mail message does not have any of said one or more unwanted properties, then sending said e-mail message to said one or more recipients; and
if said e-mail message does have any of said one or more unwanted properties, then blocking sending of at least a portion of said e-mail message to said one or more recipients;
wherein said one or more tests are applied upon receipt of said e-mail message prior to expiry of said minimum delay period and are repeated upon expiry of said minimum delay period using one or more tests current at expiry if said one or more tests have been updated during said minimum.

2. A method as claimed in claim 1, wherein if said e-mail message does have any of said one or more unwanted properties, sending of all portions of said e-mail message is blocked.

3. A method as claimed in claim 1, wherein said one or more unwanted properties include said e-mail message containing a computer virus.

4. A method as claimed in claim 3, wherein said one or more tests include comparing said e-mail message with virus definition data to detect one of more computer viruses, said virus definition data being updateable to enable detection of newly encountered computer viruses.

5. A method as claimed in claim 4, wherein said virus definition data is periodically updated using a virus definition data update source.

6. A method as claimed in claim 5, wherein said virus definition data update source is a remote internet server.

7. A method as claimed in claim 1, wherein said one or more unwanted properties include receipt within said minimum delay period of more than a threshold level of e-mail messages having one or more common characteristics.

8. A method as claimed in claim 7, wherein said one of more common characteristics include one or more of:
a common sender;
a common recipient;
a common message title;
a common message size;
a common attachment;

a common attachment type; and a common message content.

9. A method as claimed in claim 1, further comprising the step of adding applied delay data to said e-mail message indicative of said minimum delay period for which said e-mail message is stored.

10. A method as claimed in claim 9, wherein said e-mail message characteristics include presence of any applied delay data.

11. A method as claimed in claim 9, wherein authentication data is added to said e-mail message together with said applied delay data such that said applied delay data may be subsequently authenticated.

12. A method as claimed in claim 1, wherein said e-mail message is received from an external source by an e-mail server storing an e-mail postbox for at least one of said one or more recipients.

13. A method as claimed in claim 1, wherein said e-mail message is received from an internal source by an e-mail server storing an e-mail postbox for a sender of said e-mail message.

14. A method as claimed in claim 1, wherein said e-mail message is received by an e-mail server acting as a relay server for said e-mail message.

15. A method as claimed in claim 1, further comprising the step of checking for an update of said one or more tests whilst said e-mail message is being stored for said minimum delay period.

16. Apparatus for detecting an e-mail message having one or more unwanted properties using one or more tests, said one or more tests being updateable in response to detection of new unwanted properties, said apparatus comprising:

a receiver operable to receive an e-mail message having associated one or more e-mail message characteristics and addressed to one or more recipients for said e-mail message, wherein the e-mail message characteristics include at least one of:

sender address;

sender organization;

recipient address;

recipient organization;

attachment type; and e-mail message content type;

delay determining logic operable to determine a minimum delay period in dependence upon said one or more e-mail message characteristics for increasing the likelihood that said one or more tests for said unwanted properties that are current at the expiry of the minimum delay period will include countermeasures developed during the minimum delay period;

a storage device operable to store said e-mail message for said minimum delay period;

test logic operable to apply said one or more tests current at expiry of said minimum delay period to said e-mail message to identify if said e-mail message has any of said one or more of unwanted properties; and mail processing logic operable if said e-mail message does not have any of said one or more unwanted properties to send said e-mail message to said one or more recipients and operable if said e-mail message does have any of said one or more unwanted properties to block sending of at least a portion of said e-mail message to said one or more recipients;

wherein said one or more tests are applied upon receipt of said e-mail message prior to expiry of said minimum delay period and are repeated upon expiry of said minimum delay period using one or more tests current at expiry if said one or more tests have been updated during said minimum delay period.

17. Apparatus as claimed in claim 16, wherein if said e-mail message does have any of said one or more unwanted properties, said mail processing logic is operable to block sending of all portions of said e-mail message.

18. Apparatus as claimed in claim 16, wherein said one or more unwanted properties include said e-mail message containing a computer virus.

19. Apparatus as claimed in claim 18, wherein said one or more tests include comparing said e-mail message with virus definition data to detect one or more computer viruses, said virus definition data being updateable to enable detection of newly encountered computer viruses.

20. Apparatus as claimed in claim 19, further comprising virus definition update logic operable to periodically update said virus definition data using a virus definition data update source.

21. Apparatus as claimed in claim 20, wherein said virus definition data update source is a remote internet server.

22. Apparatus as claimed in claim 16, wherein said one or more unwanted properties include receipt within said minimum delay period of more than a threshold level of e-mail messages having one or more common characteristics.

23. Apparatus as claimed in claim 22, wherein said one of more common characteristics include one or more of:

a common sender;

a common recipient;

a common message title;

a common message size;

a common attachment;

a common attachment type; and a common message content.

24. Apparatus as claimed in claim 16, further comprising delay stamping logic operable to add applied delay data to said e-mail message indicative of said minimum delay period for which said e-mail message is stored.

25. Apparatus as claimed in claim 24, wherein said e-mail message characteristics include presence of any applied delay data.

26. Apparatus as claimed in claim 24, wherein said delay stamping logic also adds authentication data to said e-mail message together with said applied delay data such that said applied delay data may be subsequently authenticated.

27. Apparatus as claimed in claim 16, wherein said e-mail message is received from an external source by an e-mail server storing an e-mail postbox for at least one of said one or more recipients.

28. Apparatus as claimed in claim 16, wherein said e-mail message is received from an internal source by an e-mail server storing an e-mail postbox for a sender of said e-mail message.

29. Apparatus as claimed in claim 16, wherein said e-mail message is received by an e-mail server acting as a relay server for said e-mail message.

30. Apparatus as claimed in claim 16, further comprising update checking logic operable to check for an update of said one or more tests whilst said e-mail message is being stored for said minimum delay period.

31. A computer program product carrying a computer program for controlling a computer to detect an e-mail message having one or more unwanted properties using one or more tests, said one or more tests being updateable in response to detection of new unwanted properties, said computer program comprising:

receiver code operable to receive an e-mail message having associated one or more e-mail message characteristics and addressed to one or more recipients for said e-mail message, wherein the e-mail message characteristics include at least one of:
sender address;
sender organization;
recipient address;
recipient organization;
attachment type; and
e-mail message content type;
delay determining code operable to determine a minimum delay period in dependence upon said one or more e-mail message characteristics for increasing the likelihood that said one or more tests for said unwanted properties that are current at the expiry of the minimum delay period will include countermeasures developed during the minimum delay period;
storage code operable to store said e-mail message for said minimum delay period;
test logic operable to apply said one or more tests current at expiry of said minimum delay period to said e-mail message to identify if said e-mail message has any of said one or more of unwanted properties; and
mail processing code operable if said e-mail message does not have any of said one or more unwanted properties to send said e-mail message to said one or more recipients and operable if said e-mail message does have any of said one or more unwanted properties to block sending of at least a portion of said e-mail message to said one or more recipients;
wherein said one or more tests are applied upon receipt of said e-mail message prior to expiry of said minimum delay period and are repeated upon expiry of said minimum delay period using one or more tests current at expiry if said one or more tests have been updated during said minimum delay period.

32. A computer program product as claimed in claim 31, wherein said e-mail message does have any of said one or more unwanted properties, said mail processing code is operable to block sending of all portions of said e-mail message.

33. A computer program product as claimed in claim 31, wherein said one or more unwanted properties include said e-mail in message containing a computer virus.

34. A computer program product as claimed in claim 33, wherein said one or more tests include comparing said e-mail message with virus definition data to detect one or more computer viruses, said virus definition data being updateable to enable detection of newly encountered computer viruses.

35. A computer program product as claimed in claim 34, further comprising virus definition update code operable to periodically update said virus definition data using a virus definition data update source.

36. A computer program product as claimed in claim 35, wherein said virus definition data update source is a remote internet server.

37. A computer program product as claimed in claim 31, wherein said one or more unwanted properties include receipt within said minimum delay period of more than a threshold level of e-mail messages having one or more common characteristics.

38. A computer program product as claimed in claim 37, wherein said one of more common characteristics include one or more of:
a common sender;
a common recipient;
a common message title;
a common message size;
a common attachment;
a common attachment type; and
a common message content.

39. A computer program product as claimed in claim 31, further comprising delay stamping code operable to add applied delay data to said e-mail message indicative of said minimum delay period for which said e-mail message is stored.

40. A computer program product as claimed in claim 39, wherein said e-mail message characteristics include presence of any applied delay data.

41. A computer program product as claimed in claim 39, wherein said delay stamping code also adds authentication data to said e-mail message together with said applied delay data such that said applied delay data may be subsequently authenticated.

42. A computer program product as claimed in claim 31, wherein said e-mail message is received from an external source by an e-mail server storing an e-mail postbox for at least one of said one or more recipients.

43. A computer program product as claimed in claim 31, wherein said e-mail message is received from an internal source by an e-mail server storing an e-mail postbox for a sender of said e-mail message.

44. A computer program product as claimed in claim 31, wherein said e-mail message is received by an e-mail server acting as a relay server for said e-mail message.

45. A computer program product as claimed in claim 31, further comprising update checking code operable to check for an update of said one or more tests whilst said e-mail message is being stored for said minimum delay period.

* * * * *

UNITED STATES PATENT AND TRADEMARK OFFICE
CERTIFICATE OF CORRECTION

PATENT NO. : 6,757,830 B1  Page 1 of 1
APPLICATION NO. : 09/678688
DATED : June 29, 2004
INVENTOR(S) : Tarbotton et al.

It is certified that error appears in the above-identified patent and that said Letters Patent is hereby corrected as shown below:

In the claims:
Col. 10, line 38, after "minimum" please add --delay period.--.

Signed and Sealed this

Twenty-first Day of December, 2010

David J. Kappos
*Director of the United States Patent and Trademark Office*